United States Patent
Clauss et al.

(10) Patent No.: US 7,771,646 B2
(45) Date of Patent: Aug. 10, 2010

(54) LASER-MARKABLE MOLDING COMPOSITIONS, MOLDINGS PREPARED USING THE SAME AND METHODS OF MARKING SUCH MOLDINGS

(75) Inventors: Joachim Clauss, Darmstadt-Eberstadt (DE); Kurt Witan, Hofheim (DE); Arnold Schneller, Seeheim-Jugenheim (DE); Klaus Kurz, Kelsterbach (DE)

(73) Assignee: Ticona GmbH, Kelsterbach (DE)

( * ) Notice: Subject to any disclaimer, the term of this patent is extended or adjusted under 35 U.S.C. 154(b) by 299 days.

(21) Appl. No.: 11/665,550

(22) PCT Filed: Oct. 15, 2005

(86) PCT No.: PCT/EP2005/011098

§ 371 (c)(1),
(2), (4) Date: May 25, 2007

(87) PCT Pub. No.: WO2006/042714

PCT Pub. Date: Apr. 27, 2006

(65) Prior Publication Data

US 2007/0295689 A1    Dec. 27, 2007

(30) Foreign Application Priority Data

Oct. 15, 2004   (DE) ................. 10 2004 050 557

(51) Int. Cl.
*B29C 35/08*   (2006.01)
*C03C 15/00*   (2006.01)

(52) U.S. Cl. .................................. 264/400; 216/65

(58) Field of Classification Search ............... 264/400
See application file for complete search history.

(56) References Cited

U.S. PATENT DOCUMENTS

| | | | | |
|---|---|---|---|---|
| 5,489,639 A | * | 2/1996 | Faber et al. | 524/417 |
| 5,717,018 A | * | 2/1998 | Magerstedt et al. | 524/413 |
| 5,750,318 A | * | 5/1998 | Lambert et al. | 430/346 |
| 6,689,838 B1 | * | 2/2004 | Fischer et al. | 525/88 |
| 2004/0068089 A1 | * | 4/2004 | Charbonneaux et al. | 528/287 |

FOREIGN PATENT DOCUMENTS

| | | |
|---|---|---|
| DE | 195 38 247 | 3/1997 |
| DE | 100 53 639 | 2/2002 |
| EP | 523294 A1 * | 1/1993 |
| EP | 0 697 433 | 2/1996 |

* cited by examiner

*Primary Examiner*—Ling-Siu Choi
*Assistant Examiner*—Hui Chin
(74) *Attorney, Agent, or Firm*—Dority & Manning, P.A.

(57) ABSTRACT

Laser-markable molding compositions, molding produced therewith and method of marking the same, wherein the molding compositions comprise: (a) at least one semicrystalline thermoplastic; and (b) at least one particulate additive selected from the group consisting of (i) light-sensitive salt compounds, (ii) inorganic oxides having an average particle diameter of less than 250 nm, and combinations thereof; wherein the light-sensitive salt compounds comprise compounds having two or more captions, wherein at least one of the two or more captions is selected from the group consisting of Ti, Cr, Mn, Fe, Co, Ni, Cu, Zn, Y, Zr, Nb, Mo, Ag, Sn, Sb, La, Pr, Ta, W, and Ce; and wherein at least another of the two or more captions is selected from the group consisting of elements of periods 3-6 of main groups II and III, elements of periods 5-6 of main group IV, elements of periods 4-5 of transition groups III-VIII, and the lanthanoids.

14 Claims, No Drawings

LASER-MARKABLE MOLDING COMPOSITIONS, MOLDINGS PREPARED USING THE SAME AND METHODS OF MARKING SUCH MOLDINGS

CROSS-REFERENCE TO RELATED APPLICATIONS

This application is a national stage application, under 35 U.S.C. §371, of PCT/EP2005/011098, filed Oct. 15, 2005, which claims priority of German Application No. 10 2004 050 557.8, filed Oct. 15, 2004.

BACKGROUND OF THE INVENTION

The present invention relates to novel molding compositions based on semicrystalline engineering thermoplastics, which give laser-markable moldings with increased quality of marking. The invention further relates to moldings which are produced from these laser-markable molding compositions, to a process for laser-marking, and also to the use of selected additives for laser-marking.

Semicrystalline thermoplastics are materials with a long history of use. Functionalities such as ability for marking by laser light are of increasing significance, alongside the mechanical, thermal, electrical, and chemical properties of these materials. Examples that may be mentioned are applications in the household products sector, in keyboards, and in the electronics sector. Here, the application demands high contrast between the laser-inscribed marking and the background polymer matrix. Other advantageous factors for aesthetics are precise setting of the color of the marking and also of the matrix, and the nature of the surface of the marking. Especially if the use of the laser-marked surfaces usually renders them visible or regularly exposes them to mechanical or chemical stresses, there is a need to provide durability together with high perceived quality. In many cases this inhibits use of semicrystalline engineering thermoplastics.

Laser-markable molding compositions are known per se. One method for marking of these molding compositions with laser light consists in irradiating selected sites on the plastic with laser light and using the energy introduced to bring about a mechanical alteration or a local discoloration of the plastic. Another method for marking these molding compositions with laser light consists in using discolorable fillers, which change their color via irradiation by laser light at selected sites.

EP-A-190,997 discloses a process for laser-marking of pigmented systems, by incorporating, into a high-molecular-weight material, an additive which is sensitive to radiation and which causes discoloration. Among the additives mentioned are $TiO_2$ and $Sb_2O_3$.

The use of a very wide variety of additives in laser-markable plastics molding compositions is described in a very wide variety of patent documents. For example, EP-A-330,869 discloses the use of $TiO_2$ white pigment. EP-A-400,305 and EP-A-542,115 describe the use of copper hydroxide phosphate and, respectively, molybdenum(IV) oxide.

U.S. Pat. No. 5,063,137 discloses inter alia the use of anhydrous metal phosphates and phosphoric-acid-based glasses.

EP-A-797,511 describes the use of lamellar pigments with a layer composed of doped tin oxide.

U.S. Pat. No. 5,489,639 describes the use of selected copper salts (phosphates, sulfates, thiocyanates).

EP-A-764,683 discloses the use of copper pyrophosphate hydrate and/or manganese sulfate hydrate.

EP-A-808,866 discloses the use of boric anhydride.

WO-A-98/58805 discloses a number of copper phosphates.

WO-A-99/55773 describes inter alia the use of zinc hydroxystannate and stannous oxalate.

DE-A-199 05 358 discloses the use of alkali metal copper diphosphate.

WO-A-01/007 19 describes the use of $Sb_2O_3$ with particle sizes above 0.5 µm.

EP-A-1,190,988 discloses the use of certain bismuth mixed oxides.

WO-A-01/78994 proposes the use of copper fumarate, copper maleate, and mixtures of these.

DE-A-100 53 639 proposes the use of selected salts, inter alia various cobalt phosphates and iron phosphates.

DE-A-100 34 472 describes the use of particles surface-modified with certain silicon compounds.

EP-A-753,536 describes the use of at least two types of metal oxides.

EP-A-105,451 describes polyphenylene sulfide molding compositions which have been modified for laser-marking with selected additives, for example with the combination of lead chromate and lead molybdate, with nickel antimony titanate, or with cobalt zinc silicon.

The laser-markable plastics molding compositions available hitherto are in many respects still unsatisfactory.

Pigments used for laser inscribability frequently give only an inadequate color difference between the marked site and the unirradiated plastics matrix, therefore giving poor color contrast and poor legibility of the inscription. In other cases, the color contrast which is initially acceptable alters with time, with the result that the inscription becomes almost invisible. There is also the risk of undesired alteration of the properties of the plastic as increasing amounts of pigment are added.

If a light-scattering particle is used as laser-sensitive additive, and acts as a white pigment, this approach has the resultant limitation that although increasing content of additive increases sensitivity to light it can both reduce the contrast of the marking and reduce the depth of penetration of the marking.

If a metal compound (e.g. oxide or salt) is used, the respective intrinsic color generally contributes to discoloration of the matrix and is generally detrimental to aesthetics.

Starting from the abovementioned prior art, an object underlying the present invention is to provide molding compositions based on semicrystalline engineering thermoplastics which can be marked by conventional lasers, and in which the color of the matrix, the color of the marking, and also the surface topology of the marking, can be optimized, with good contrast of the marking, without any resultant disproportionate impairment of the remainder of the property profile of the engineering thermoplastics.

BRIEF SUMMARY OF THE INVENTION

Surprisingly, molding compositions have now been found which avoid the advantages described to a sufficient extent.

The present invention provides laser-markable molding compositions comprising

A) at least one semicrystalline thermoplastic and
B) at least one particulate light-sensitive compound of salt type which when exposed to laser light changes its color or leads to a color change in the plastic, and which contains two or more cations of which one is selected from the group consisting of: Ti, Cr, Mn, Fe, Co, Ni, Cu, Zn, Y, Zr, Nb, Mo, Ag, Sn, Sb, La, Pr, Ta, W, Ce, and of which another is selected from the group consisting of: elements of the 3rd-6th Periods of main group II and III, the 5th-6th Periods of main group IV, or else the 4th-5th Periods of transition group III-VIII of the Periodic Table of the Elements, or of the lanthanoids, and/or C) at least one particulate inorganic oxide with an average particle diameter of less than 250 nm, preferably less than 200 nm, and D) if appropriate, other conventional additives.

The invention uses, as component B), particulate light-sensitive compounds of salt type, or mixtures, where these comprise two or more cations. In any particular case, the selection of the cations is such that when the compound B) of salt type is mixed into component A) it brings about no change, or a desired change, in the color of the molding composition. Furthermore, the selection of the ratios by weight of the cations with respect to one another is such that, after irradiation of the molding composition, although the lightness of the molding composition has changed at the irradiated sites, the color of the matrix has not changed.

The average particle size ($d_{50}$) of component B is preferably smaller than 10 µm. The size of suitable primary particles can be from a few nanometers up to a number of micrometers.

Component B has to contain at least two different cations from the groups described above. If appropriate, other cations can be present, e.g. composed of elements of the 2nd-5th period of main group I of the Periodic Table of the Elements.

The invention uses particulate additives as component C), and these on the one hand increase the sensitivity of the molding composition to laser light but on the other hand bring about very little light scattering. This criterion is generally satisfied by inorganic oxides which although they have a refractive index different from that of the matrix comprise primary particles with an average diameter ($d_{50}$) below the wavelength of the light.

The components of the formulation for the inventive molding composition are therefore the matrix (A) comprising semicrystalline engineering thermoplastics, and also the additives (B) in the form of particulate light-sensitive compounds or mixtures having the combination defined above of cations, and/or additives (C) in the form of nanoparticulate inorganic oxides, and also, if appropriate, other conventional additives (D).

Surprisingly, the two types of particulate additives complement one another in a non-trivial manner. Both component B and component C increase sensitivity to laser light via interaction with the matrix A.

Component B affects if appropriate with other colorant additives or pigments the intrinsic color of the matrix, and also the color of the marking.

Given suitable selection of component C, its effect on the color of matrix and marking is small.

DETAILED DESCRIPTION OF THE INVENTION

A feature of laser-inscribable molding compositions for the purposes of this application is that on irradiation with intensive light, preferably from a conventional laser light source, a color change occurs at the irradiated site when comparison is made with the unirradiated matrix. This color difference can be discerned as a local difference in luminance, as a local difference in colorimetric coordinates, e.g. in the CIELab system, or as a local difference in calorimetric coordinates in the RGB system. These effects can occur with various light sources.

Components B) and/or C) are generally selected so as to have the strongest possible absorption in the region of the wavelength of the available laser light.

The regions of wavelength of the laser light used are not in principle subject to any restrictions. The wavelength of suitable lasers is generally in the range from 157 nm to 10.6 µm, preferably in the range from 532 nm to 10.6 µm.

By way of example, mention may be made here of $CO_2$ lasers (10.6 µm) and Nd:YAG lasers (1064 nm), or pulsed UV lasers.

The wavelengths of typical excimer lasers are as follows: $F_2$ excimer lasers (157 nm), ArF excimer lasers (193 nm), KrCl excimer lasers (222 nm), KrF excimer lasers (248 nm, XeCl excimer lasers (308 nm), XeF excimer lasers (351 nm), frequency-multiplied Nd:YAG lasers with wavelengths of 532 nm (frequency-doubled), of 355 nm (frequency-tripled), or 265 nm (frequency-quadrupled).

It is particularly preferable to use Nd:YAG lasers (1064 or 532 nm) and $CO_2$ lasers.

The energy densities of the lasers used in the invention are generally in the range from 0.3 mJ/cm$^2$ to 50 J/cm$^2$, preferably from 0.3 mJ/cm$^2$ to 10 J/cm$^2$. If pulsed lasers are used, the pulse frequency is generally in the range from 1 to 30 kHz.

The inventive molding composition typically comprises from 50 to 99.95% by weight, preferably from 80 to 99.5% by weight, particularly preferably from 95 to 99% by weight, of matrix component (A), which comprises one or more of the semicrystalline engineering thermoplastics. Since the matrix is defined as semicrystalline and therefore, given the presence of domains whose refractive index differs, is non-transparent, it is mainly those components near to the surface that contribute to laser-marking.

Polymers that can be used in the matrix are not only those having linear chain molecules but also branched or slightly crosslinked polymers. The degrees of polymerization of the semicrystalline thermoplastics that can be used in the invention are not subject to any particular restriction, and are of the same order of magnitude as those of comparable molding compositions that are not inscribable by light.

The matrix component (A) used in the invention has to be semicrystalline, and this means that the DSC plot of thermoplastics that can be used shows a melting range.

The matrix component (A) used in the invention is not subject to any particular restrictions, as long as it involves a thermoplastic and semicrystalline polymer.

Examples of semicrystalline thermoplastics (A) that can be used with preference are polyacetals (A1), polyesters (A2), polyamides (A3), polyarylene ethers and polyarylene sulfides (A4), polyether sulfones and polysulfones (A5), polyaryl ether ketones (A6), polyolefins (A7), liquid-crystalline polymers (A8), and also, if appropriate, other thermoplastic polymers as partners in a blend (AX).

For the purposes of this description, polyacetals (A1) are polymers whose main repeat unit is oxymethylene groups (—$CH_2O$—). These encompass polyoxymethylene homopolymers, polyoxymethylene copolymers, polyoxymethylene terpolymers, and polyoxymethylene block copolymers.

For the purposes of this description, polyesters (A2) are thermoplastic polymers having repeat ester groups in the main chain. Examples are polycondensates of naphthalenedicarboxylic acids, terephthalic acid, isophthalic acid, adipic acid, azelaic acid, sebacic acid, dodecanedioic acid, cyclohexanedicarboxylic acids, mixtures of these carboxylic acids, and ester-forming derivatives with dihydric alcohols, such as ethylene glycol, 1,3-propanediol, 1,4-butanediol, 1,4-butenediol, and 1,6-hexanediol, 1,4-hexanediol, 1,4-cyclohexanediol, 1,4-di(hydroxymethyl)cyclohexane, bisphenol A, neopentyl glycol, oligo- or polyethylene glycols, oligo- or polypropylene glycols, oligo- or poly(tetramethylene) glycols, mixtures of these diols, and also ester-forming derivatives of the same, and also with other possible M, BB, and AB comonomers.

Particularly preferred matrix components (A) are polyethylene terephthalate, polybutylene terephthalate, and polyetherester block copolymers.

For the purposes of this description, polyamides (A3) are thermoplastic polymers having repeat amide groups in the main chain. They encompass not only homopolymers of aminocarboxylic acid type but also those of the diamine-dicarboxylic acid type, and also copolymers with other possible AA, BB, and AB comonomers. The polyamides that can be used are known and are described by way of example in Encyclopedia of Polymer Science and Engineering, Vol. 11, pp. 315-489, John Wiley & Sons, Inc. 1988.

Examples of polyamides (A3) are polyhexamethyleneadipamide, poly-hexamethyleneazelamide, polyhexamethylenesebacamide, polyhexa-methylenedodecanediamide, poly-11-aminoundecanamide, and bis(p-aminocyclohexyl)methanedodecanediamide, or the products obtained via ring-opening of lactams, e.g. polycaprolactam or polylaurolactam. Other suitable polyamides are those based on terephthalic or isophthalic acid as acid component and/or trimethylhexamethylenediamine or bis(p-amino-cyclohexyl)propane as diamine component, and also polyamide parent resins prepared via copolymerization of two or more of the abovementioned polymers or their components. An example that may be mentioned of these is a copolycondensate composed of terephthalic acid, isophthalic acid, hexamethylenediamine, and caprolactam.

For the purposes of this description, polyarylene sulfides (A4) are thermoplastic polymers having repeat sulfur groups in the substantially aromatic main chain. They encompass not only homopolymers but also copolymers.

For the purposes of this description, liquid-crystalline polymers (A8) are in particular p-hydroxybenzoic acid- and/or 6-hydroxy-2-naphthoic acid-based liquid-crystalline copolyesters and copolyesteramides. Liquid-crystalline plastics to be used with very particular advantage are generally fully aromatic polyesters which form anisotropic melts and have average molar masses (Mw=weight average) of from 2000 to 200 000 g/mol, preferably from 3500 to 50 000 g/mol, and in particular from 4000 to 30 000 g/mol. Particularly suitable liquid-crystalline polymers are described by way of example in Saechtling, Kunststoff-Taschenbuch [Plastics Handbook], Hanser-Verlag, 27th Edition, on pages 517-521.

For the purposes of this description, thermoplastic polymers as partners (AX) in a blend can be any desired other semicrystalline, liquid-crystalline, and amorphous polymers.

For the purposes of this description, light-sensitive compounds (B) are organic or inorganic compounds of salt type with the combinations defined above of different cations, or a mixture composed of compounds of salt type with the combinations defined above of different cations, where these, on exposure to a laser-light source, change their color and, respectively, lead to a color change in the plastic, at the irradiated site.

The compounds (B) can be traditional salts with defined stoichiometry composed of one or more anions with two or more cations derived from different elements, but they can also involve compounds of non-stoichiometric constitution, where these have at least two cations derived from different elements.

For a given system of anions, occurrence of ion-exchanger functionality is possible evidence that complex structures of this type have been formed, incorporating two or more different cations.

In one possible embodiment of the invention, a mixture of compounds each having one cation is used, and can be converted on heating to at least one compound having two cations.

The above definition of the inventive concept includes inter alia the following embodiments, which can be used as alternatives or in combination with one another. In one embodiment, the additives used for the inventive molding composition have per se at least two different cations, having been produced for example via reaction of at least two simple salts (each having one cation), taking the form of mixed salts (B) in the polymer matrix (A) to give the inventive molding composition. The other embodiment makes use of the same selection of cations as the first embodiment, but consists in a mixture in which the simple salts present have not yet reacted with one another. This embodiment is possible if the salts present in the mixture react at elevated temperatures and under conditions which are otherwise conventional (e.g. residual moisture) to give mixed salts, i.e. new reaction products (B), thus giving access to the inventive molding composition.

In turn, there are a number of variants of the latter embodiment. The simple compounds of salt type present in the mixture can be reacted with one another prior to addition to the plastics matrix (A), in order to form a compound of salt type having cations complying with the inventive selection rules, whereupon the reaction product can be used as additive (B) for the inventive molding composition. In another embodiment, the mixture of the simple salts is mixed with the plastics matrix (A) to be rendered laser-inscribable. On heating of the parent composition, the simple compounds of salt type then react with one another and give identical or similar non-simple salts, which are the same as, or at least similar to, those in the first part of this example.

Elements whose cations can be used for light-induced color changes are Ti, Cr, Mn, Fe, Co, Ni, Cu, Zn, Y, Zr, Nb, Mo, Ag, Sn, Sb, La, Pr, Ta, W and Ce.

Elements whose cations complement those mentioned are those of the 3rd-6th Periods of main group II and III, the 5th-6th Periods of main group IV, or else the 4th-5th Periods of transition group III-VIII, or of the lanthanoids.

If appropriate, cations of elements of the 2nd-5th period of main group I of the Periodic Table of the Elements can also be present as third component.

The anions of component (B) are not in principle subject to any restrictions, as long as they permit formation of compounds having cations of at least two different elements.

Anions preferably used in component (B) are those containing at least two different elements.

Particularly preferred components (B) have, as anions, inorganic oxo anions, or else anions of the organic carboxylic acids, or else of carbonic acid, as long as they can give non-simple compounds having two or more cations. The anions in particularly preferred components (B) comprise phosphorus-containing oxo anions.

Preference is given to combinations in which the unirradiated compound (B) absorbs in the region of the wavelength of the light used.

Preference is moreover given to those combinations in which the intrinsic color of the unirradiated compound (B) can be adjusted via variation of the molar ratios of the cations.

In one embodiment of the invention, the unirradiated molding composition has any desired intrinsic color, and the irradiated molding composition exhibits a color change which is as marked as possible when compared therewith. The term color difference used here can mean a change from one hue to another, for example from yellow to red. However, for the purposes of the invention, this term is also intended to mean a change in lightness, for example from white to gray, from gray to black, or from pale brown to dark brown. The term color difference is also intended to mean a change in opacity, for example from transparent to white or black or brown.

The color difference can be perceived by the human eye. The invention is likewise intended to include color differences that are detected by optical measurement equipment or those perceived by means of a detector at a wavelength outside the range of sensitivity of the human eye. An example that may be mentioned of this is the use of readers which use diode lasers in the NIR region.

For the visible light region, the CIELab system can clearly be used to describe the color difference. Here, high color contrast means occurrence of a high value for dE*, where $$dE^* = \sqrt{2;(L^*_1 - L^*_2)^2 + (a^*_1 - a^*_2)^2 + (b^*_1 - b^*_2)^2}$$

Index 1 here represents the unirradiated molding composition, and index 2 here represents the irradiated molding composition.

The CIELab system is a color space specified in 1976 by the Commission Internationale d'Eclairage, where $L^*$= lightness, $a^*$=red-green color data, and $b^*$=yellow-blue data.

In one preferred embodiment of the invention, the unirradiated molding composition has maximum lightness (i.e. maximum lightness coordinate $L^*$) in the CIELab color space) and minimum intrinsic color (i.e. minimum deviation from the black-white axis: in quantitative terms minimum $a^*$, minimum $b^*$). The intention in this case is that the irradiated molding composition have minimum lightness (minimum lightness coordinate $L^*$) and nevertheless minimum intrinsic color (in quantitative terms minimum $a^*$, minimum $b^*$).

In another preferred embodiment of the invention, the unirradiated molding composition has maximum lightness (maximum lightness coordinate $L^*$ in the CIELab color space) and minimum intrinsic color (minimum deviation from the black-white axis: in quantitative terms minimum $a^*$, minimum $b^*$). In this case, the intention is that the intrinsic color of the irradiated molding composition be as marked as possible (maximum $a^*$ and/or $b^*$).

In one preferred embodiment of the inventive composition, the anions of component (B) have the general formula $A_aO_o(OH)_y^{z-}$, where A=tri- or pentavalent phosphorus, tetravalent molybdenum, or hexavalent tungsten, a, o, and z, independently of one another, are whole numbers with values from 1 to 20, and y is a whole number with values from 0 to 10.

In another preferred embodiment of the inventive composition, component (B) has, as cations, at least one combination of two different elements from the group consisting of: copper, tin, antimony, and iron.

In another particularly preferred embodiment of the inventive composition, component (B) has anions of phosphorus (V) acid and/or of phosphorus(III) acid, and condensates thereof, and, if appropriate, has other hydroxide ions and, as cations, has Cu and Fe, or Cu and Sn, or Cu and Sb, or Sn and Fe.

Physical parameters of component (B), such as particle size, have a decisive effect, alongside chemical constitution, on the quality of laser-inscribability. The scattering behavior of the particles affects not only the color coordinates and lightness coordinates of the unirradiated matrix but also the optical uniformity in the irradiated and unirradiated region. The average particle size is also an important measure of dispersibility in the polymer matrix, and thus also affects the sensitivity of the molding composition to light.

Components (B) with an average particle diameter of less than 10 μm have proven suitable. The average particle diameter of component (B) is preferably below 5 μm.

Quantitative data concerning particle size in this application always relate to the average particle size ($d_{50}$) and to the size of the primary particles. For the purposes of this invention, particle diameter is determined by conventional methods, such as light scattering (if appropriate using polarized light), microscopy, or electron microscopy, narrow-gap flow methods with counting, sedimentation methods, or other commercially available methods.

The proportions used of component (B) are advantageously from 0.01 to 2.0% by weight. Contents of from 0.02 to 1.0% by weight are particularly preferred.

For the purposes of this description, light-sensitizing inorganic oxides (C) are oxides which on exposure to irradiation with light promote formation of colorant compounds. First possibility is a change in the intrinsic color of these oxides, or else there may be a catalytic contribution resulting in formation, in their vicinity, of compounds having appropriate absorption.

For the purposes of this description, the term oxides includes compounds in which some of the oxygen atoms are present in the form of hydroxy groups. In this case, too, compounds of stoichiometric and non-stoichiometric constitution can be involved.

Suitable inorganic oxides of component (C) can be based on elements of the 3rd-6th Periods of main group III or IV, the 5th-6th Periods of main group V, or else the 4th-5th Periods of transition group III-VIII, or of the lanthanoids.

Oxides (C) whose use is preferred are $Al_2O_3$, $SiO_2$, silicatic or aluminosilicatic minerals, silicatic glasses, $TiO_2$, ZnO, $ZrO_2$, $SnO_2$, $Sb_2O_3$, $Sb_2O_5$, $Bi_2O_3$, and also, if appropriate, mixed oxides with other doping elements. $TiO_2$ in anatase and/or rutile form is particularly preferred.

Physical parameters of component (C), such as particle size, have a decisive effect, alongside chemical constitution, on the quality of laser-inscribability. If by virtue of its scattering behavior the oxidic additive acts as permanent white pigment, the lightness coordinates of the unirradiated and the irradiated sites are increased and the contrast of marking is therefore limited. Average particle size is another important measure for the maximum particle-matrix interface achievable given good dispersion, and thus also affects the sensitivity of the molding composition to light.

Suitable components (C) have been found to be those with an average particle diameter of less than 250 nm. Particle diameter is determined for the purposes of this invention by way of example via electron-beam methods or X-ray methods. The average particle diameter of component (C) is preferably smaller than or equal to 200 nm, in particular smaller than or equal to 100 nm, particularly preferably from 10 to 100 nm. The stated particle sizes are based on the primary particles used in the additive. As a function of the quality of the dispersion, agglomerates of these primary particles can form in the matrix, and these may naturally have greater diameter.

The proportions advantageously used of component (C) are from 0.01 to 2.0% by weight. Contents of from 0.02 to 1.0% by weight are particularly preferred.

Other conventional additives (D) are an optional constituent of the inventive thermoplastic molding compositions.

Among these are by way of example stabilizers for improving resistance to the action of light, UV radiation and weathering (D1), stabilizers for improving heat resistance and thermo-oxidative resistance (D2), stabilizers for improving hydrolysis resistance (D3), stabilizers for improving acidolytic resistance (D4), lubricants (D5), mold-release agents (D6), colorant additives (D7), crystallization-regulating substances and nucleating agents (D8), flame retardants (D9), impact modifiers (D10), fillers (D11), plasticizers (D12), and, if appropriate, other conventional additives (D13).

Stabilizers for weathering and light and UV radiation (D1) that can be present in the inventive molding composition are one or more substances from the group of (D1A) benzotriazole derivatives, (D1B) benzophenone derivatives, (D1C) oxanilide derivatives, (D1D) aromatic benzoates, such as salicylates, (D1E) cyanoacrylates, (D1F) resorcinol derivatives, and (D1G) sterically hindered amines.

In one preferred embodiment, the inventive molding composition comprises not only at least one of the stabilizers of the groups D1A to D1F, but also sterically hindered amines of the group D1G.

In one particularly preferred embodiment, the inventive molding composition comprises a benzotriazole derivative D1A together with a hindered amine D1G.

Examples of (D1A) benzotriazole derivatives are 2-[2'-hydroxy-3',5'-bis(1,1-dimethylbenzyl)phenyl]benzotriazole, 2-[2'-hydroxy-3'-tert-butyl-5'-methyl-phenyl)-5-chlorobenzotriazole, 2-(2'-hydroxy-5'-methylphenyl)benzo-triazole.

Examples of benzophenone derivatives (D1B) are 2-hydroxy-4-n-octoxy-benzophenone and 2-hydroxy-4-n-dodecyloxybenzophenone.

Examples of sterically hindered amines (D1G) are 2,2,6,6-tetramethyl-4-piperidyl compounds, e.g. bis(2,2,6,6-tetramethyl-4-piperidyl)sebacate or the polymer of dimethyl succinate and 1-(2-hydroxyethyl)-4-hydroxy-2,2,6,6-tetramethyl-4-piperidine.

The proportions used of the weathering stabilizers (D1) mentioned are advantageously from 0.01 to 2.0% by weight. Total D1A-D1G contents of from 0.02 to 1.0% by weight are particularly preferred.

The inventive molding composition can comprise, as stabilizers for improving heat resistance and thermo-oxidative resistance (D2), antioxidants, e.g. one or more substances from the group (D2A) sterically hindered phenols, (D2B) phenol ethers, (D2C) phenol esters of organic or phosphorus-containing acids, examples being pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl)propionohydrazide), hexamethylene glycol bis[3-(3,5-di-tert-butyl-4-hydroxyphenyl)propionate], 3,5-di-tert-butyl-4-hydroxytoluene, (D2D) hydroquinones, and (D2E) aromatic secondary amines.

Preference is given to pentaerythrityl tetrakis[3-(3,5-di-tert-butyl-4-hydroxyphenyl)propionate], hydroquinones (D2D), and aromatic secondary amines (D2E).

One particularly preferred embodiment uses a sterically hindered phenol (D2B) together with a phosphorus compound. The proportions used of the antioxidants (D2) mentioned can be from 0.01 to 10% by weight. Total contents of up to 2% by weight are preferred.

Particular preference is given to the combination of Ciba Irganox® 1010 with Irgafos® 126.

The inventive molding composition can therefore comprise, as stabilizers for improving hydrolytic resistance (D3), one or more substances from the group of the (D3A) glycidyl ethers or (D3B) carbodiimides. Examples are mono-, di-, or, if appropriate, polyglycidyl ethers of ethylene glycol, propanediol, 1,4-butanediol, 1,3-butanediol, glycerol, and the trisglycidyl ether of trimethylolpropane. The amounts that can be used of the stabilizers (D3) mentioned can be from 0 to 3% by weight. Total contents up to 1.0% by weight are preferred. Polymeric or monomeric carbodiimides are particularly preferred.

The inventive molding composition can therefore comprise, as stabilizers for improving acidolytic resistance (D4), acid-abstracting substances, that is to say one or more substances from the group of the nitrogen-containing compounds (D4A), of the alkaline earth metal compounds (D4B), or of the bases (D4C).

If the matrix comprises polyacetals or polymers which are similarly acid-labile, one preferred embodiment uses not only nitrogen-containing compounds (D4A) but also alkaline earth metal compounds (D4B).

Examples of nitrogen-containing compounds (D4A) and melamine, melamine-formaldehyde adducts, and methylolmelamine.

Examples of alkaline earth metal compounds (D4B) are calcium propionate, tricalcium citrate, and magnesium stearate.

Examples of bases (D4C) are $Na_2CO_3$ and $NaHCO_3$.

The preferred proportions used of the acid scavengers (D4) mentioned are from 0.001 to 1.0% by weight. Acid scavengers in the form of mixtures can also be used.

The inventive molding composition can comprise, as lubricants (D5) or mold-release agents (D6), waxes, e.g. polyethylene waxes and/or oxidized polyethylene waxes, their esters and amides, or else fatty acid esters or fatty acid amides.

Preference is given to mixed ethylenebis(fatty acid amides) and montan wax glycerides.

The proportions preferably used of lubricants (D5) and mold-release agents (D6) are from 0.01 to 10% by weight. Total contents of from 0.05 to 3% by weight are particularly preferred. Lubricants can generally also act as mold-release agents, and vice versa.

The inventive molding composition can comprise, as colorant additives (D7), colorant substances, these being known as colorants. These can be either organic or inorganic pigments, or else dyes.

There is no particular limitation on the pigments and dyes. However, pigments should be used which disperse uniformly in the molding composition and do not increase their concentration at interfaces or at individual domains, thus permitting provision of excellent color uniformity, color consistency, and mechanical properties.

By way of example, mention may be made of anthroquinone dyes and various pigments, such as carbon black, azo pigments, phthalocyanine pigments, perylene pigments, quinacridone pigments, anthraquinone pigments, indoline pigments, titanium dioxide pigments, iron oxide pigments, and cobalt pigments. Any desired suitable combination of colorant substances can also be used within the present invention. If carbon blacks are used, they are often found not only to act as colorants but to contribute to weathering resistance.

Total content of colorant substances is preferably from 0.05 to 10% by weight, particularly preferably up to 5% by weight. If content is too low, the desired depth of color is often not achieved; higher contents are mostly unnecessary, and are economically unattractive, and sometimes impair other properties, such as the mechanical properties of the molding composition.

The inventive molding composition can comprise, as crystallization-regulating substances (D8), homogeneously or heterogeneously acting nucleating agents, i.e. one or more substances from the group of solid inorganic compounds and crosslinked polymers. Examples of (D8) nucleating agents are fumed silicon dioxide with or without surface modification, calcium fluoride, sodium phenylphosphinate, aluminum oxide, fine-particle polytetrafluoroethylene, valentinite, pyrophyllite, dolomite, melamine cyanurate, boron compounds, such as boron nitride, silicic acid, montmorillonite, and also organic modified montmorillonite, organic or inorganic pigments, melamine-formaldehyde condensates, and phyllosilicates.

In one preferred embodiment, the inventive molding composition comprises, as nucleating agent, talc or branched or partially crosslinked polymers.

Proportions used of nucleating agents are preferably from 0.0001 to 5% by weight. Total contents of from 0.001 to 2.0% by weight are preferred.

The inventive molding composition can moreover comprise additives (D9) which have an advantageous effect on fire performance. Any of the known flame retardants can be used, both those containing halogen and those which are halogen-free.

Total contents of from 0 to 30% by weight are preferred.

Examples of flame retardants are (D9A) nitrogen-containing flame retardants, (D9B) phosphorus-containing flame retardants (where the oxidation state of phosphorus is from +5 to −3), (D9C) antimony trioxide (often in combination with halogen-containing synergists), (D9D) halogen-containing compounds, and also (D9E) low-halogen-content or halogen-free formulations.

Examples of D9A and D9B are melamine polyphosphate, melamine cyanurate, resorcinol diphosphate, polyhalobiphenyl, polyhalodiphenyl ether, polyhalophthalic acid and its derivatives, polyhalooligo- and -poly-carbonates, substituted phosphines, such as triphenylphosphine, substituted phosphine oxides, melamine phosphate esters, phosphinic esters and corresponding salts, elemental phosphorus, hypophosphite esters and corresponding salts, phosphite esters and corresponding salts, phosphate esters and corresponding salts.

The inventive molding composition can moreover comprise additives (D10) which, as impact modifiers, have an advantageous effect on mechanical properties.

Total contents of from 0 to 20% by weight are preferred.

Examples of these are particulate polymers, which are often elastomeric or comprise elastomeric components.

Preferred types of these elastomers are those known as ethylene-propylene (EPM) or ethylene-propylene-diene (EPDM) rubbers. EPM rubbers generally have practically no residual double bonds, whereas EPDM rubbers can have from 1 to 20 double bonds for every 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyl-tricyclo[5.2.1.0.$^{2,6}$]-3,8-decadiene, and mixtures of these.

Preference is given to 1,5-hexadiene, 5-ethylidenenorbornene and dicyclopentadiene.

The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups.

Other preferred elastomers are emulsion polymers whose preparation is described, for example, by Blackley in the monograph "Emulsion Polymerization". The emulsifiers and catalysts which can be used are known per se. In principle it is possible to use homogeneously structured elastomers or else those with a shell structure. The shell-type structure is determined by the sequence of addition of the individual monomers. The morphology of the polymers is also affected by this sequence of addition. Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate. The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase. If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers.

Instead of graft polymers whose structure has more than one shell, it is also possible to use homogeneous, i.e. single-shell, elastomers composed of 1,3-butadiene, isoprene, and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Other preferred rubbers are polyurethanes, polyether esters, and silicone rubbers.

It is, of course, also possible to use mixtures of the types of rubber listed above.

The inventive thermoplastic molding compositions can comprise, as fillers and reinforcing agents (D11), fibrous, lamellar, or particulate fillers and reinforcing agents.

Examples are carbon fibers, aramid fibers, glass fibers, glass beads, amorphous silica, asbestos, calcium silicate (wollastonite), aluminum silicate, magnesium carbonate, kaolin, chalk, lime, marble, powdered quartz, mica, baryte, feldspar, phyllosilicates and aluminosilicates, bentonite, montmorillonite.

The fillers may have been modified via organic components or silanization. The proportion of these fillers is generally up to 50% by weight, preferably up to 35% by weight.

The inventive molding composition can moreover comprise additives (D12) which affect the mobility of the chain in the amorphous phases or lower the glass transition temperature or act in some other way as plasticizer.

Examples are dioctyl phthalate, dibenzyl phthalate, butyl benzyl phthalate, hydrocarbon oils, N-(n-butyl)benzenesulfonamide, and o- and p-tolylethyl-sulfonamide.

The inventive molding composition can comprise, as other additives (D13), additives which as in the respective prior art provide or improve functional properties of the molding composition (e.g. electrical conductivity and/or antistatic performance).

An example of a method of production of the inventive molding composition or of a suitable intermediate product is the mixing of all of the constituents at an elevated temperature, i.e. above the melting point of the, of some of the, or of all of the, matrix polymers (A) in assemblies with good mixing action, e.g. in Brabenders, extruders, preferably twin-screw extruders, or on mixing rolls.

Another method of preparation is the mixing of components at room temperature and subsequent melting of the matrix polymers in an extruder, preferably twin-screw extruder.

Another method of preparation is possible if the matrix A comprises a polymer whose structure derives from a polycondensation reaction: in this case, additives to improve dispersion can be added before the final molecular weight is achieved. Especially for nano-scale additives C, this variant has advantages. If the matrix comprises a polyester, these and other components can be added at the end of the transesterification reaction or at the start of the polycondensation reaction.

The components can likewise, individually or in combination, first be processed to give relatively highly concentrated masterbatches, and these can then be further processed with other components to give the inventive mixture.

The additives mentioned for the purposes of this description can be added in any desired suitable steps. The final formulation of the molding composition can also be produced by delaying addition of individual additives, or of two or more additives, until shortly prior to production of the molding. Another suitable method is the mixing of pellets with an additive paste or the mixing of two or more types of pellets, where at least one corresponds to the inventive molding composition, or they finally combine to give the inventive constitution.

The inventive molding composition is thermoplastic and therefore accessible to the conventional methods of processing.

The usual method of processing uses pellets, these being further processed to give moldings in a known manner, e.g. via extrusion, injection molding, vacuum forming, blow molding, or foaming.

The inventive molding composition is suitable as an engineering material for production of the semifinished product and of finished parts. The present invention also provides moldings in irradiated and unirradiated form which are produced from the inventive molding composition by means of conventional processing techniques, in particular via injection molding. The inventive moldings can be used in the computer industry, electrical industry, electronics industry, household products industry, and motor vehicle industry.

Laser light can be used for marking and inscribing of inventive moldings, e.g. keyboards, cables, lines, decorative strips or functional parts in the heating sector, ventilation sector, and cooling sector, or switches, plugs, levers, and grips, comprising the inventive molding composition.

The inventive moldings can moreover be used as packaging.

The present invention moreover provides a process for laser-marking of thermoplastic moldings, encompassing the steps of:

i) production of a molding from a molding composition comprising at least one semicrystalline thermoplastic A) and components B) and/or C) and, if appropriate, D) as defined above, and ii) irradiation of predetermined parts of at least one surface of the molding with laser light in order to bring about a change in appearance at the irradiated sites.

The present invention likewise provides the use of the components B) and/or C) defined above for laser-marking of moldings.

A feature of the resultant markings is that they are resistant to wiping and scratching, stable during subsequent sterilization processes, and can be applied in a marking process under hygienically clean conditions.

Another application sector for laser inscription is provided by plastics tags for the individual marking of animals, known as poultry rings, cattle tags, or ear tags. The inscription has to be highly durable, since some of the tags remain on the animals for a number of years.

The examples below illustrate the invention. No resultant restriction is intended.

EXAMPLES

Specimens were produced and tested, comprising polyoxymethylene (POM) or polybutylene terephthalate (PBT) as semicrystalline engineering thermoplastic (A).

The inventive examples comprised, alongside component A, either light-sensitive compounds having two or more cations (B) or nano-scale particles of light-sensitizing oxides (C), or a combination of both. In contrast, the specimens taken as comparative examples comprised either light-sensitive compounds having one cation or micro-scale particles of light-sensitizing oxides, or served as reference without light-sensitive additive.

The table below lists the constitutions of the specimens.

If the example has the entry POM as component A, the matrix used comprised Hostaform® C9021 polyoxymethylene (Ticona GmbH).

Conventional additives $D_{POM}$ used comprised Irgano® 1010 (Ciba) as antioxidant, Tinuvin® 234 and Tinuvin® 770 (each Ciba Spezialitätenchemie GmbH) as light stabilizer, Licowachs® C(Clariant GmbH) as flow aid and mold-release agent, and calcium propionate and melamine as acid abstractor.

If the example has the entry PBT as component A, the matrix used comprised Celanex® 2003 PBT (Ticona GmbH).

Conventional additive $D_{PBT}$ used comprised, as antioxidant, Irgano® 1010 and Irgafos® 126 (each from Ciba Spezialitätenchemie GmbH), talc as nucleating agent, Licolub® WD4 (Clariant GmbH) as flow aid and mold-release agent, and Stabaxol® (Rheinchemie Rheinau GmbH) as moisture abstractor.

If the example has the entry CuOHP as component B, cupric hydroxide phosphate purchased from Aldrich or Chemische Fabrik Budenheim KG was used.

If the example has the entry FeP as component B, an additive powder was used comprising both ferrous and ferric cations. The material purchased and used was ferrous phosphite with small amounts of ferric ion and small amounts of phosphate, from Chemische Fabrik Budenheim KG.

If the example has the entry CuFeP as component B, additive powders were used comprising not only cupric but also ferrous and ferric cations, these having been purchased from Chemische Fabrik Budenheim KG. The additives were used either in the form of unreacted mixture of the simple salts (about 50% of cupric hydroxide phosphate with about 50% of iron phosphate) or else in the form of reacted mixed salts for preparation of the molding compositions. X-ray diffraction spectra obtained on the molding composition exhibited marked differences from those of the simple starting salts.

If the example has the entry SnCuP as component B, additive powders were used comprising both stannous and cupric cations, having been purchased from Chemische Fabrik Budenheim KG. The additives were used either in the form of an unreacted mixture of the simple salts (about 80% of stannous phosphate with about 20% of cupric hydroxide phosphate) or else in the form of reacted mixed salts for preparation of the molding compositions. X-ray diffraction spectra obtained on the molding composition exhibited marked differences from those of the simple starting salts.

If the example has the entry CuSbP as component B, additive powders were used comprising both cupric and Sb(III) cations, having been purchased from Chemische Fabrik Budenheim KG. The additives were used either in the form of an unreacted mixture of the simple salts (about 80% of antimony(III) phosphate with about 20% of cupric hydroxide phosphate) for preparation of the molding compositions. X-ray diffraction spectra obtained on the molding composition exhibited marked differences from those of the simple starting salts.

If the example has the entry nano-$TiO_2$ (n-$TiO_2$) as component C, titanium dioxides were used whose particle diameters were a few nanometers, e.g. P25 from Degussa or Hombitec RM130F from Sachtleben.

High-shear incorporation into a relatively low-molecular-weight prepolymer was used with the aim of incorporating these additives in nanoparticle form and substantially avoiding agglomerates.

If the comparative example has the entry $\mu$-$TiO_2$ as component D7, 1% of titanium dioxide white pigment with $d_{50}$ of 0.3 $\mu$m was used, e.g. grades 2078 or 2220 from Kronos.

The molding compositions were compounded in a twin-screw extruder with two kneading zones (Berstorff ZE-25). In the case of molding compositions comprising nano-$TiO_2$, the nano-additives were added before polycondensation ended.

The molding compositions were then injection-molded to give plaques of dimensions 90 mm×65 mm×1 mm.

A DPL Magic Marker from ACI Laser GmbH (Sömmerda, Thüringen) was used for laser inscription, and the inscription parameters were varied as follows:

Pump intensities were varied from 40 to 90%, and pulse frequencies from 1 to 6 kHz, while horizontal advance rate and vertical line offset were selected so as to give 40, 50, and 75 $\mu$m cubic patterns.

To determine the optical properties of the matrix and markings, a Colorview II digital camera was used with analySIS Pro image-evaluation software from Soft Imaging Systems, mounted on a BX51 microscope from Olympus.

To determine lightness/darkness coordinates (along the black-white L axis), a micrograph was recorded using maximum reflected light, and this was converted to a gray-scale image and averaged across the region recorded. This method was used to obtain digital quantitative data from 0 for "black" to 255 for "white". The images recorded for all of the specimens were made under identical conditions of illumination. The matrix and the laser markings were in each case separately recorded and evaluated.

To determine the color coordinates, a micrograph was recorded using maximum reflected light, and this was averaged across the region recorded, and the red, green, and blue components. This method was used to take digital quantitative data from 0 to 255 for the components of the three primary colors. The images recorded for all of the specimens were made under identical conditions of illumination. The matrix and the laser markings were in each case separately recorded and evaluated.

The results are used as a basis for the information collated in the table.

If the example has been evaluated as "good" (+) in the light-sensitivity column, pump intensities smaller than or equal to 50% and pulse frequencies greater than 4 kHz were sufficient to achieve adequate contrasts in marking fields.

If the example has been evaluated as "unsatisfactory" (−) in the light-sensitivity column, pump intensities smaller than or equal to 50% and pulse frequencies greater than 4 kHz were not sufficient to achieve adequate contrasts in marking fields.

If the example has been evaluated as "moderate" (0) in the light-sensitivity column, the results were intermediate.

If the example has been evaluated as "good" (+) in the matrix-lightness column, the lightness coordinates of the PBT matrix were greater than 222 or those of the POM matrix were greater than 220.

If the example has been evaluated as "unsatisfactory" (−) in the matrix-lightness column, the lightness coordinates of the PBT matrix were smaller than 220 or those of the POM matrix were smaller than 216.

If the example has been evaluated as "moderate" (0) in the matrix-lightness column, the results were intermediate.

If the example has been evaluated as "white", "light", or "pale gray" in the matrix-color column, the red-green-blue components were substantially equal, in the case of "turquoise" the intensities recorded in the green-blue region were somewhat greater, and in the case of "reddish" the intensities recorded in red were somewhat greater.

If the example has been evaluated as "good" (+) in the darkness-of-marking column, the darkness coordinates (=255-lightness) of the marking were greater than 80.

If the example has been evaluated as "unsatisfactory" (−) in the darkness-of-marking column, the darkness coordinates of the marking were smaller than 50.

If the example has been evaluated as "moderate" (0) in the darkness-of-marking column, the results were intermediate.

If the example has been evaluated as "black", "anthracite", or "dark gray" in the marking-color column, the red-green-blue components were substantially equal, in the case of "dark brown" the intensities recorded in the red-green or red-blue region were somewhat greater, and in the case of "dark red" the intensities recorded in red were somewhat greater.

If the example has been evaluated as "good" (+) in the contrast column, the matrix lightness/marking lightness ratio was greater than 1.25.

If the example has been evaluated as "unsatisfactory" (−) in the contrast column, the matrix lightness/marking lightness ratio was relatively small.

If the example has been evaluated as "good" (+) in the topology-of-marking column, it was not possible to feel any local roughness increase at the marked sites (no craters or depressions or foamed elevations).

If the example has been evaluated as "unsatisfactory" (−) in the topology-of-marking column, it was distinctly possible to feel a local increase in roughness at the marked sites (no craters or depressions or foamed elevations).

If the example has been evaluated as "moderate" (0) in the topology-of-marking column, the results were intermediate.

The table shows that the inventive molding compositions have no unsatisfactory evaluations of laser-inscription, whereas all of the comparative examples have at least one criterion classified as unsatisfactory.

Comparative examples are indicated by "c"; inventive examples are numbered.

TABLE

| | Comp. (A) (% by wt.) | A | Comp. (B) (% by wt.) | B | Comp. (C) (% by wt.) | C | Comp. (D) (% by wt.) | D7 | D | Light-fastness | Lightness of matrix | Color of matrix | Darkness of marking | Color of marking | Contrast | Topology |
|---|---|---|---|---|---|---|---|---|---|---|---|---|---|---|---|---|
| C1 | 98.55 | POM | 0 | — | 0 | — | 1.45 | — | $D_{POM}$ | − | 0 | light | none | none | − | 0 |
| C2 | 98.35 | POM | 0.5 | CuOHP | 0 | — | 1.45 | — | $D_{POM}$ | + | − | turquoise | + | black | + | 0 |
| C3 | 97.55 | POM | 0 | — | 0 | — | 2.45 | μ-TiO2 | $D_{POM}$ | − | + | white | − | light | − | 0 |
| C4 | 99.15 | PBT | 0 | — | 0 | — | 0.85 | — | $D_{PBT}$ | − | 0 | light | 0 | anthracite | + | − |
| C5 | 98.95 | PBT | 0.2 | CuOHP | 0 | — | 0.85 | — | $D_{PBT}$ | + | − | turquoise | + | black | + | + |
| C6 | 98.95 | PBT | 0.2 | FeP | 0 | — | 0.85 | — | $D_{PBT}$ | + | − | reddish | + | dark red | + | − |
| C7 | 98.15 | PBT | 0 | — | 0 | — | 1.85 | μ-TiO2 | $D_{PBT}$ | 0 | + | white | − | gray | − | − |
| 8 | 98.35 | POM | 0.5 | CuFeP mixture | 0 | — | 1.45 | — | $D_{POM}$ | + | 0 | light gray | + | dark brown | + | 0 |
| 9 | 98.35 | POM | 0.5 | CuFeP mixed salt | 0 | — | 1.45 | — | $D_{POM}$ | + | 0 | light gray | + | dark brown | + | 0 |
| 10 | 98.35 | POM | 0.5 | SnCuP mixture | 0 | — | 1.45 | — | $D_{POM}$ | + | + | light | + | dark gray | + | 0 |
| 11 | 98.35 | POM | 0.5 | SnCuP mixed salt | 0 | — | 1.45 | — | $D_{POM}$ | + | + | light gray | + | dark gray | + | 0 |
| 12 | 98.35 | POM | 0.5 | CuSbP | 0 | — | 1.45 | — | $D_{POM}$ | + | + | light | + | dark gray | + | 0 |
| 13 | 97.35 | POM | 0.5 | CuFeP mixture | 0 | — | 2.45 | μ-TiO2 | $D_{POM}$ | 0 | + | white | 0 | dark brown | + | 0 |
| 14 | 97.35 | POM | 0.5 | CuFeP mixed salt | 0 | — | 2.45 | μ-TiO2 | $D_{POM}$ | 0 | + | white | 0 | dark brown | + | 0 |
| 15 | 97.35 | POM | 0.5 | SnCuP mixture | 0 | — | 2.45 | μ-TiO2 | $D_{POM}$ | 0 | + | white | 0 | dark gray | + | 0 |
| 16 | 97.35 | POM | 0.5 | SnCuP mixed salt | 0 | — | 2.45 | μ-TiO2 | $D_{POM}$ | 0 | + | white | 0 | dark gray | + | 0 |
| 17 | 97.35 | POM | 0.5 | CuSbP | 0 | — | 2.45 | μ-TiO2 | $D_{POM}$ | 0 | + | white | 0 | dark gray | + | 0 |
| 18 | 98.95 | PBT | 0.2 | CuFeP mixture | 0 | — | 0.85 | — | $D_{PBT}$ | + | 0 | light gray | + | dark brown | + | + |
| 19 | 98.95 | PBT | 0.2 | CuFeP mixed salt | 0 | — | 0.85 | — | $D_{PBT}$ | + | 0 | light gray | + | black | + | + |
| 20 | 98.95 | PBT | 0.2 | SnCuP mixture | 0 | — | 0.85 | — | $D_{PBT}$ | 0 | 0 | light | + | dark gray | + | + |
| 21 | 98.95 | PBT | 0.2 | SnCuP mixed salt | 0 | — | 0.85 | — | $D_{PBT}$ | 0 | 0 | light | + | dark gray | + | + |

TABLE-continued

| | Comp. (A) (% by wt.) | A | Comp. (B) (% by wt.) | B | Comp. (C) (% by wt.) | C | Comp. (D) (% by wt.) | D7 | D | Light-fast-ness | Light-ness of matrix | Color of matrix | Dark-ness of marking | Color of marking | Con-trast | Topol-ogy |
|---|---|---|---|---|---|---|---|---|---|---|---|---|---|---|---|---|
| 22 | 98.95 | PBT | 0.2 | CuSbP | 0 | — | 0.85 | — | $D_{PBT}$ | 0 | 0 | light | + | dark gray | + | 0 |
| 23 | 98.75 | PBT | 0.2 | CuFeP | 0.2 | n-TiO2 | 0.85 | — | $D_{PBT}$ | + | + | light gray | + | dark brown | + | + |
| 24 | 98.75 | PBT | 0.2 | SnCuP | 0.2 | n-TiO2 | 0.85 | — | $D_{PBT}$ | + | + | light | + | black | + | + |
| 25 | 98.75 | PBT | 0.2 | SnCuP | 0.2 | n-TiO2 | 0.85 | — | $D_{PBT}$ | + | + | light | + | black | + | 0 |
| 26 | 98.95 | PBT | 0 | — | 0.2 | n-TiO2 | 0.85 | — | $D_{PBT}$ | 0 | + | light | + | black | + | 0 |
| 27 | 97.95 | PBT | 0.2 | CuFeP mixture | 0 | — | 1.85 | µ-TiO2 | $D_{PBT}$ | + | + | white | + | black | + | 0 |
| 28 | 97.95 | PBT | 0.2 | CuFeP mixed salt | 0 | — | 1.85 | µ-TiO2 | $D_{PBT}$ | + | + | white | + | black | + | 0 |
| 29 | 97.95 | PBT | 0.2 | SnCuP mixture | 0 | — | 1.85 | µ-TiO2 | $D_{PBT}$ | + | + | white | + | black | + | + |
| 30 | 97.95 | PBT | 0.2 | SnCuP mixed salt | 0 | — | 1.85 | µ-TiO2 | $D_{PBT}$ | + | + | white | + | black | + | + |
| 31 | 97.95 | PBT | 0.2 | CuSbP | 0 | — | 1.85 | µ-TiO2 | $D_{PBT}$ | + | + | white | + | black | + | 0 |
| 32 | 97.75 | PBT | 0.2 | CuFeP mixture | 0.2 | n-TiO2 | 1.85 | µ-TiO2 | $D_{PBT}$ | + | + | white | + | black | + | + |
| 33 | 97.75 | PBT | 0.2 | CuFeP mixed salt | 0.2 | n-TiO2 | 1.85 | µ-TiO2 | $D_{PBT}$ | + | + | white | + | black | + | + |
| 34 | 97.75 | PBT | 0.2 | SnCuP mixture | 0.2 | n-TiO2 | 1.85 | µ-TiO2 | $D_{PBT}$ | + | + | white | + | black | + | + |
| 35 | 97.75 | PBT | 0.2 | SnCuP mixed salt | 0.2 | n-TiO2 | 1.85 | µ-TiO2 | $D_{PBT}$ | + | + | white | + | black | + | + |
| 36 | 97.75 | PBT | 0.2 | CuSbP | 0.2 | n-TiO2 | 1.85 | µ-TiO2 | $D_{PBT}$ | + | + | white | + | black | + | 0 |
| 37 | 97.75 | PBT | 0.2 | — | 0.2 | n-TiO2 | 1.85 | µ-TiO2 | $D_{PBT}$ | + | + | white | + | black | + | 0 |

The invention claimed is:

1. A laser-markable molding composition comprising:
   (a) at least one semicrystalline thermoplastic polymer, wherein the at least one semicrystalline thermoplastic is present in an amount of 50 to 99.5% by weight based on the molding composition; and
   (b) at least one particulate additive comprising light-sensitive salt compounds;
   wherein the light-sensitive salt compounds comprise compounds having two or more captions wherein the two or more captions are derived from different elements and an anion selected from the group consisting of inorganic phosphorus-containing oxo anions, wherein at least one of the two or more captions is selected from the group consisting of Ti, Cr, Mn, Fe, Co, Ni, Cu, Zn, Y, Zr, Nb, Mo, Ag, Sn, Sb, La, Pr, Ta, W, and Ce; and wherein at least another of the two or more captions is selected from the group consisting of elements of periods 3-6 of main groups II and III, elements of periods 5-6 of main group IV, elements of periods 4-5 of transition groups III-VIII, and the lanthanoids.

2. The molding composition according to claim 1, wherein the at least one particulate additive further comprises an inorganic oxide having an average particle diameter of less than 250 nm.

3. The molding composition according to claim 1, wherein the light-sensitive salt compound has an average particle size ($d_{50}$) of less than 10 µm.

4. The molding composition according to claim 1, wherein the light-sensitive salt compound further comprises at least a third different caption selected from the group consisting of elements of periods 2-5 of main group I.

5. The molding composition according to claim 1, wherein the at least one semicrystalline thermoplastic comprises a polymer selected from the group consisting of polyacetals, polyesters, polyamides, polyarylene ethers, polyarylene sulfides, polyether sulfones, polysulfones, polyaryl ether ketones, polyolefins, liquid-crystalline polymers, and combinations thereof.

6. The molding composition according to claim 1, wherein the light-sensitive salt compound comprises an anion according to the general formula $A_aO_o(OH)_y^{z-}$; wherein A represents one or more elements selected from the group consisting of trivalent phosphorus, pentavalent phosphorus, tetravalent sulfur, pentavalent sulfur, hexavalent sulfur, tetravalent molybdenum, and hexavalent tungsten; a, o, and z each independently represent whole numbers of 1 to 20; and y represents a whole number of 0 to 10.

7. The molding composition according to claim 1, wherein the two or more captions comprise a combination of at least two metal ions selected from the group consisting of copper, tin, antimony, and iron.

8. The molding composition according to claim 6, wherein the two or more captions comprise a combination of at least two metal ions selected from the group consisting of copper, tin, antimony, and iron.

9. The molding composition according to claim 2, wherein the inorganic oxide has an average particle diameter of less than 200 nm.

10. The molding composition according to claim 2, wherein the inorganic oxide and the at least one semicrystalline thermoplastic have different refractive indices.

11. The molding composition according to claim 2, wherein the inorganic oxide comprises a compound selected from the group consisting of $Al_2O_3$, $SiO_2$, silicatic minerals, aluminosilicatic minerals, silicatic glasses, $TiO_2$, ZnO, $ZrO_2$, $SnO_2$, $Sb_2O_3$, $Sb_2O_5$, $Bi_2O_3$, mixed oxides thereof and doped oxides thereof.

12. The molding composition according to claim 1, further comprising an additive combination comprising a sterically hindered phenol and a phosphorus compound.

13. A molding prepared by shaping a laser-markable molding composition according to claim 1.

14. A process comprising:
(a) providing a molding according to claim 13;
(b) irradiating at least one predetermined portion of a surface of the molding with laser light such that a change in appearance at the irradiated site portion is effected.

* * * * *

UNITED STATES PATENT AND TRADEMARK OFFICE
CERTIFICATE OF CORRECTION

| | | |
|---|---|---|
| PATENT NO. | : 7,771,646 B2 | Page 1 of 1 |
| APPLICATION NO. | : 11/665550 | |
| DATED | : August 10, 2010 | |
| INVENTOR(S) | : Joachim Clauss et al. | |

It is certified that error appears in the above-identified patent and that said Letters Patent is hereby corrected as shown below:

On the Title page, Item (57), Lines 9, 10 and 13 of the Abstract, the word captions should be cations Column 19, Lines 48, 49, 52, and 55, Claim 1 - the word captions should be cations Column 20, Line 40, Claim 4 - the word caption should be cation Column 20, Line 65, Claim 8 - the word caption should be cation Signed and Sealed this
Ninth Day of August, 2011

David J. Kappos
*Director of the United States Patent and Trademark Office*